(12) United States Patent
Ichikawa

(10) Patent No.: US 8,158,202 B2
(45) Date of Patent: Apr. 17, 2012

(54) HONEYCOMB STRUCTURE AND METHOD FOR MANUFACTURING SAME

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 628 days.

(21) Appl. No.: 12/338,605

(22) Filed: Dec. 18, 2008

(65) Prior Publication Data

US 2009/0136710 A1    May 28, 2009

Related U.S. Application Data

(63) Continuation of application No. PCT/JP2007/062539, filed on Jun. 21, 2007.

(30) Foreign Application Priority Data

Jun. 23, 2006 (JP) ................................. 2006-174449

(51) Int. Cl.
*B05D 1/36* (2006.01)

(52) U.S. Cl. ........ 427/269; 427/282; 427/289; 219/552; 219/553; 428/116; 428/117; 55/523; 55/524

(58) Field of Classification Search .................. 427/269, 427/282, 289; 219/552, 553; 428/116, 117; 55/523, 524

See application file for complete search history.

(56) References Cited

U.S. PATENT DOCUMENTS

| 5,188,779 A | 2/1993 | Horikawa et al. |
| 5,629,067 A | 5/1997 | Kotani et al. |
| 2004/0071932 A1 | 4/2004 | Ishihara et al. |
| 2005/0163676 A1* | 7/2005 | Kato ............................ 422/179 |
| 2005/0174062 A1 | 8/2005 | Tanaka et al. |
| 2006/0073970 A1 | 4/2006 | Yamada |
| 2006/0121240 A1* | 6/2006 | Hirai et al. .................... 428/116 |
| 2006/0168908 A1 | 8/2006 | Ichikawa et al. |
| 2006/0216465 A1 | 9/2006 | Kai et al. |
| 2006/0249888 A1 | 11/2006 | Ishihara et al. |
| 2008/0210090 A1 | 9/2008 | Zuberi |

FOREIGN PATENT DOCUMENTS

| CN | 1701164 A | 11/2005 |
| EP | 1 544 425 A1 | 6/2005 |
| EP | 1 580 181 A2 | 9/2005 |

(Continued)

OTHER PUBLICATIONS

Jun. 23, 2011 Office Action in U.S. Appl. No. 12/604,728.

(Continued)

*Primary Examiner* — Michael Cleveland
*Assistant Examiner* — Xiao Zhao
(74) *Attorney, Agent, or Firm* — Oliff & Berridge, PLC

(57) ABSTRACT

A honeycomb structure 1 of the present invention includes: a cylindrical cell structure 2 having porous partition walls and a plurality of cells separated and formed by the partition walls and functioning as fluid passages, and an outer peripheral coat layer 3 disposed so as to cover the outer periphery of the cell structure 2, and the outer peripheral coat layer 3 has an outer peripheral coat portion 6 disposed so as to cover the outer periphery of the cell structure 2 and a protruding portion protruding outside from an end face 8 of the cell structure 2 and disposed so as to cover the outside portion on the end face 8 of the cell structure 2. In the honeycomb structure 1 of the present invention, the outer peripheral coat layer 3 is effectively inhibited from being damaged and peeled.

2 Claims, 12 Drawing Sheets

FOREIGN PATENT DOCUMENTS

| | | |
|---|---|---|
| EP | 1 632 654 A1 | 3/2006 |
| EP | 1 840 938 A1 | 10/2007 |
| EP | 2 092 977 A2 | 8/2009 |
| JP | U-50-45342 | 5/1975 |
| JP | A-3-275309 | 12/1991 |
| JP | A-5-269388 | 10/1993 |
| JP | A-2002-70529 | 3/2002 |
| JP | A-2005-199179 | 7/2005 |
| JP | A-2008-043850 | 2/2008 |
| WO | WO 2004/106702 A1 | 12/2004 |

OTHER PUBLICATIONS

Oct. 28, 2011 Office Action in U.S. Appl. No. 12/604,728.
Jul. 29, 2011 Extended European Search Report in European Patent Application No. 09 25 2484.2.
U.S. Appl. No. 11/168,487 filed Feb. 17, 2009.
Dec. 19, 2011 Office Action in Chinese Patent Application No. 200780023154.0 (with English translation).

* cited by examiner

RELATED ART

RELATED ART

RELATED ART

RELATED ART

HONEYCOMB STRUCTURE AND METHOD FOR MANUFACTURING SAME

TECHNICAL FIELD

The present invention relates to a honeycomb structure and a method for manufacturing the honeycomb structure. More specifically, the present invention relates to a honeycomb structure where an outer peripheral coat layer disposed so as to cover an outer periphery of the cell structure is effectively inhibited from being damaged or peeled and to a method for manufacturing the honeycomb structure.

BACKGROUND ART

There has conventionally been used a honeycomb structure made of ceramic as a filter for trapping particulate matter in exhaust gas from an automobile, in particular, diesel particulate matter (DPF: Diesel Particulate Filter) or as a catalyst carrier for loading a catalyst for purifying nitrogen oxide (NOx), carbon monoxide (CO), hydrocarbon (HC), etc., in exhaust gas. As such a honeycomb structure, for example, as shown in FIGS. 14 to 17, there has been proposed a honeycomb structure 51 provided with a cell structure 52 (also referred to as a cell structural portion) and an outer peripheral coat layer 53 (also referred to as an outer peripheral coat portion) disposed on the outer peripheral face of the cell structure 52 (see, for example, Patent Documents 1 and 2).

Such a conventional honeycomb structure 51 is constituted in such a manner that an end portion of the outer peripheral coat layer 53 is at the same level as an end face of the cell structure 52. Here, FIG. 14 is a perspective view schematically showing a conventional honeycomb structure, FIG. 15 is a plan view showing an end face of the honeycomb structure shown in FIG. 14, FIG. 16 is a B-B line cross-sectional view in FIG. 14, and FIG. 17 is a partially enlarged view of the end face shown in FIG. 15.

Such a honeycomb structure 51 is incorporated in an exhaust gas system of a diesel engine or the like by a canning technique using a holding member in order to trap and remove particulate matter contained in exhaust gas from, for example, a diesel engine. For example, as shown in FIG. 18, the outer peripheral face of the honeycomb structure 51 is covered with a heat resistant holding member 66 having compressive elasticity such as a wire mesh mat and put in a metal container 67 (converter container) with applying compressive surface pressure via the holding member 66.

At this time, a retainer ring 69 is disposed in the outer peripheral portion of the honeycomb structure 51 lest the honeycomb structure 51 should have displacement due to, for example, pressure of the exhaust gas or vibrations of the engine to keep the honeycomb structure 51 in the metal container 67. Here, FIG. 18 is a cross-sectional view including the central axis and schematically showing an example of a state where a conventional honeycomb structure is fixed in a cylindrical metal container. Incidentally, the reference numeral 70 denotes a gas seal.

In addition, as shown in FIG. 19, there is another example where an outer peripheral face of the honeycomb structure 51 is covered with a holding member 58 such as a ceramic mat having gas sealability instead of disposing the retainer ring 69 (see FIG. 18) to put the honeycomb structure 51 in the metal container 67 with applying surface pressure to incorporate the honeycomb structure 51 into an exhaust gas system of a diesel engine or the like. Here, FIG. 19 is a cross-sectional view including the central axis and schematically showing another example of a state where a conventional honeycomb structure is fixed in a cylindrical metal container.

Patent Document 1: JP-A-H5-269388
Patent Document 2: JP-A-H3-275309

DISCLOSURE OF THE INVENTION

However, in the case of using the conventional honeycomb structure 51 by fixing in the metal container 67 using the canning technique as shown in FIG. 18, there arises a problem of damage caused in the outer peripheral coat layer 53 constituting the honeycomb structure 51 or peeling of the outer peripheral coat layer 53 from the cell structure 52.

Specifically, since the aforementioned retainer ring 69 is fixed on the inner surface of the metal container 67 by welding or the like, when the metal container 67 expands in the outside direction by heat of the exhaust gas, the retainer ring 69 tends to move together in the outside direction.

On the other hand, since the honeycomb structure 51 is formed by using a material such as ceramic having smaller thermal expansion than that of the metal container 67, the retainer ring 69 moves relatively outside at the end faces of the honeycomb structure 51 to scratch the outer peripheral portion of the end face, thereby generating tensile stress in the outside direction at the end face outer peripheral portion of the honeycomb structure 51. Therefore, the conventional honeycomb structure 51 has a problem of damage in the outer peripheral coat layer 53 or peeling of the outer peripheral coat layer 53 from the cell structure 52 by the tensile stress.

In addition, as shown in FIG. 19, in the case that the conventional honeycomb structure 51 is put in the metal container 59 without using the retainer ring 69 (see FIG. 18), the aforementioned problems of damage and peeling due to contact of the retainer ring 69 (see FIG. 18) are hardly caused. However, since the boundary portion between the cell structure 52 and the outer peripheral coat layer 53 is directly exposed to exhaust gas, there arise problems of chipping and erosion generated from the boundary portion.

The present invention has been made in view of such problems of prior art and aims to provide a honeycomb structure where an outer peripheral coat layer disposed so as to cover an outer periphery of the cell structure is effectively inhibited from being damaged or peeled and to a method for manufacturing the honeycomb structure.

According to the present invention, there is provided the following honeycomb structure and manufacturing method for the honeycomb structure.

[1] A honeycomb structure provided with a cylindrical cell structure having porous partition walls and a plurality of cells separated and formed by the partition walls and functioning as fluid passages, and an outer peripheral coat layer disposed so as to cover the outer periphery of the cell structure; wherein the outer peripheral coat layer has an outer peripheral coat portion disposed so as to cover the outer periphery of the cell structure and a protruding portion protruding outside from an end face of the cell structure and disposed so as to cover an outside portion at the end face of the cell structure.

[2] A honeycomb structure according to the above [1], provided with plugging portions plugging opening portions of predetermined cells on one end portion side of the cell structure and plugging opening portions of the other cells on the other end portion side of the cell structure.

[3] A method for manufacturing a honeycomb structure, the method including a step of forming kneaded clay for forming to obtain a cylindrical cell structure having partition walls separating and forming a plurality of cells functioning as fluid passages and a step of applying an outer peripheral coat material so as to cover the outer periphery of the cell structure to form an outer peripheral coat layer; wherein, in a state that both the end faces are held by two holding members in such a manner that an outside portion of at least one of the end faces is opened, the outer peripheral coat material is applied so as to cover the outer periphery and the outside portion opened at the end face of the cell structure, to form the outer peripheral coat portion disposed so as to cover the outer periphery of the cell structure and the protruding portion protruding outside from the end face of the cell structure and disposed so as to cover the outside portion at the end face of the cell structure (hereinbelow sometimes referred to as the "first manufacturing method").

[4] A method for manufacturing a honeycomb structure, the method including a step of forming kneaded clay for forming to obtain a cylindrical cell structure having partition walls separating and forming a plurality of cells functioning as fluid passages and a step of applying an outer peripheral coat material so as to cover the outer periphery of the cell structure to form an outer peripheral coat layer; wherein, after the outer peripheral coat material is applied so as to cover the outer periphery of the cell structure, the outer peripheral coat material is further applied so as to cover the outside portion at an end face of at least one side of the cell structure, to form the outer peripheral coat layer having the outer peripheral coat portion disposed so as to cover the outer periphery of the cell structure and the protruding portion protruding outside from the end face of the cell structure and disposed so as to cover an outside portion at the end face of the cell structure (hereinbelow sometimes referred to as the "second manufacturing method").

In a honeycomb structure of the present invention, the outer peripheral coat layer disposed so as to cover the outer periphery of the cell structure is effectively inhibited from being damaged or peeled. In addition, by a method for manufacturing a honeycomb structure of the present invention, such a honeycomb structure can easily be manufactured at low costs.

DESCRIPTION OF REFERENCE NUMERALS

1: honeycomb structure, 2: cell structure, 3: outer peripheral coat layer, 4: partition wall, 5: cell, 6: outer peripheral coat portion, 7: protruding portion, 8: end face (end face of cell structure), 11: cell structure with outer wall, 12: outer wall, 13: grinding stone, 14: holding member, 14a: spacer, 15: opening outside portion in end face, 16: outer peripheral coat material, 17: spatula for coating, 18: holding member, 19: outer peripheral coat material (first outer peripheral coat material), 20: outer peripheral coat material (second outer peripheral coat material), 26: holding member, 27: metal container, 28: holding member, 29: retainer ring, 30: gas seal, 51: honeycomb structure, 52: cell structure, 53: outer peripheral coat layer, 66: holding member, 67: metal container, 68: holding member, 69: retainer ring, 70: gas seal Best Mode For Carrying Out The Invention Hereinbelow, the best mode for carrying out the present invention will be described. However, the present invention is by no means limited to the following embodiment, and it should be understood that modes where modifications, improvements, or the like, are added to the following embodiment on the basis of ordinary knowledge of a parson of ordinary skill within the range of not deviating from the gist of the present invention are also within the range of the present invention.

Figure 1:
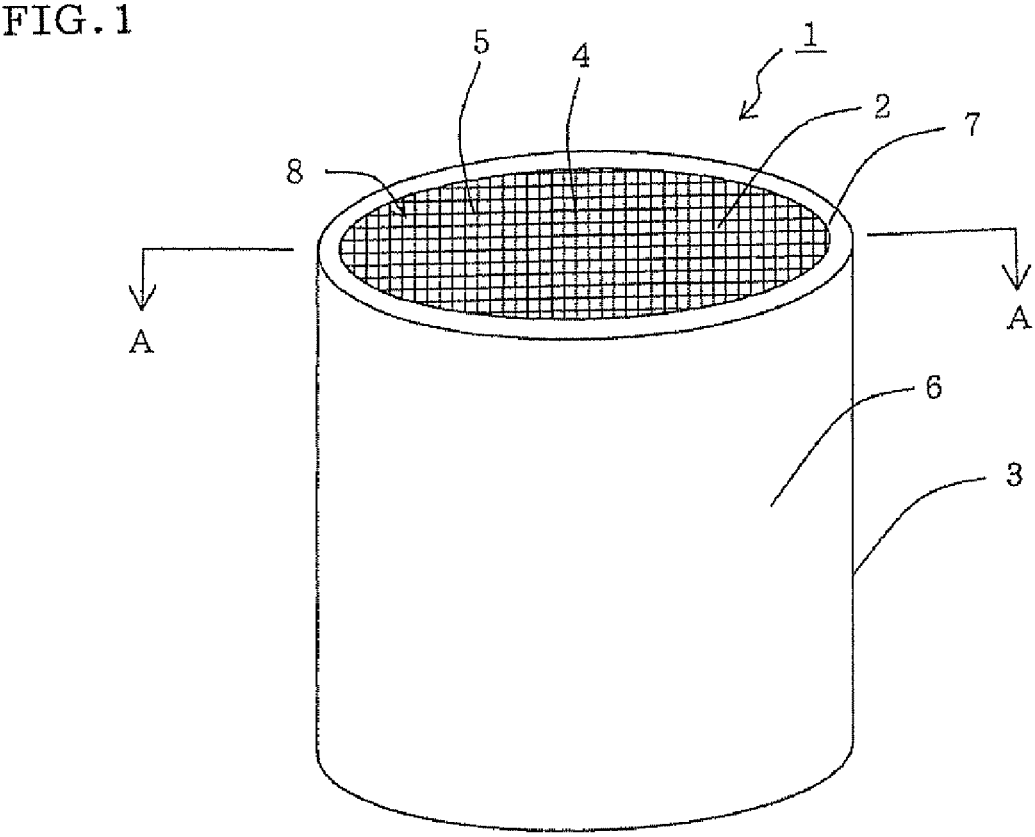
FIG. 1 is a perspective view schematically showing an embodiment of the honeycomb structure of the present invention.
Figure 2:
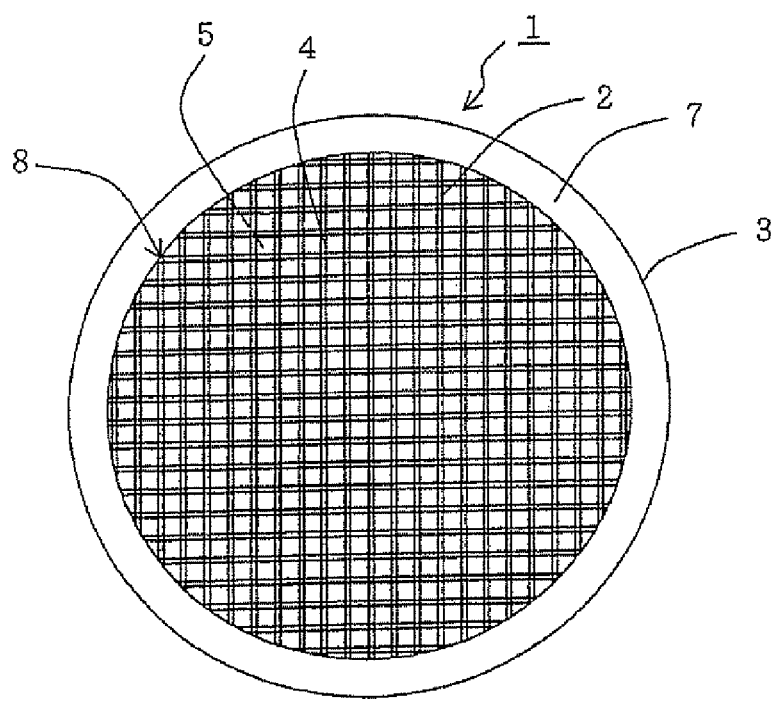
FIG. 2 is a plan view showing an end face of the honeycomb structure shown in FIG. 1.
Figure 3:
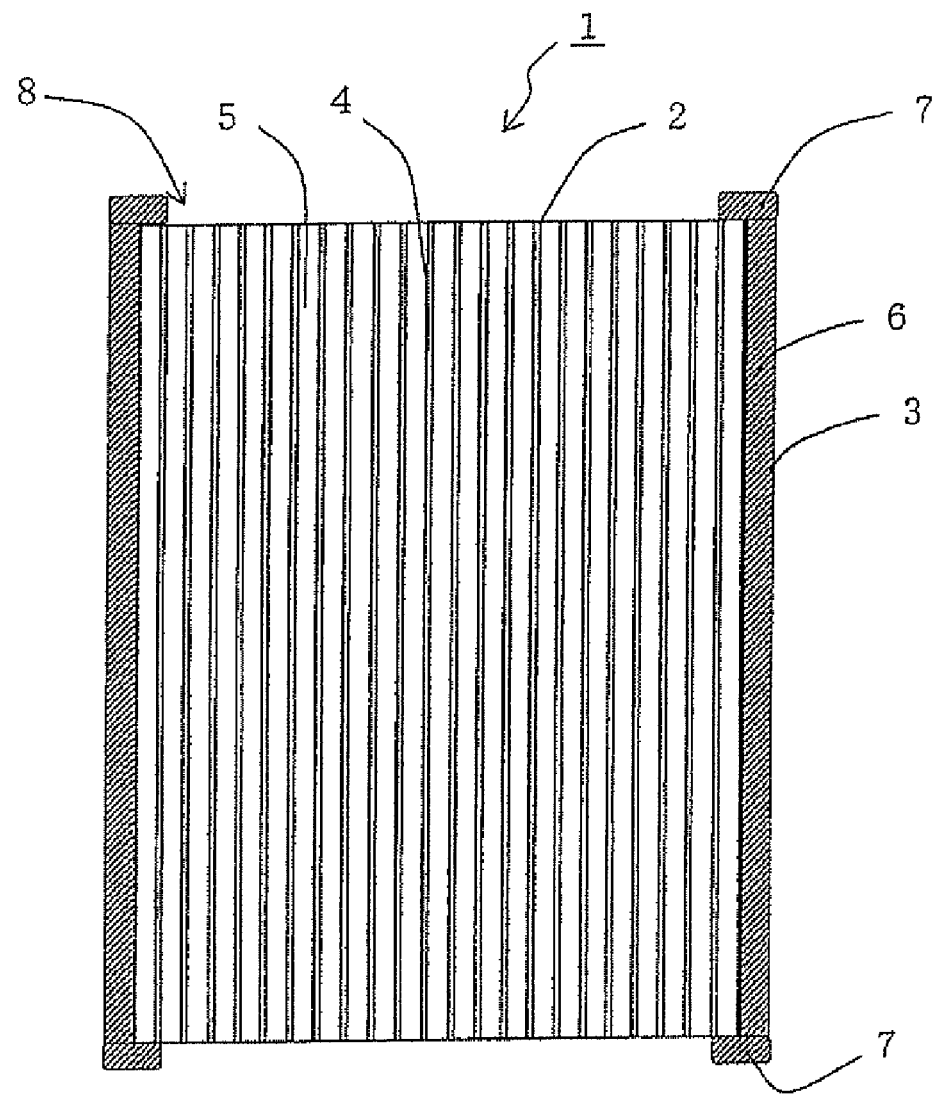
FIG. 3 is an A-A line cross-sectional view in FIG. 1.
Figure 4:
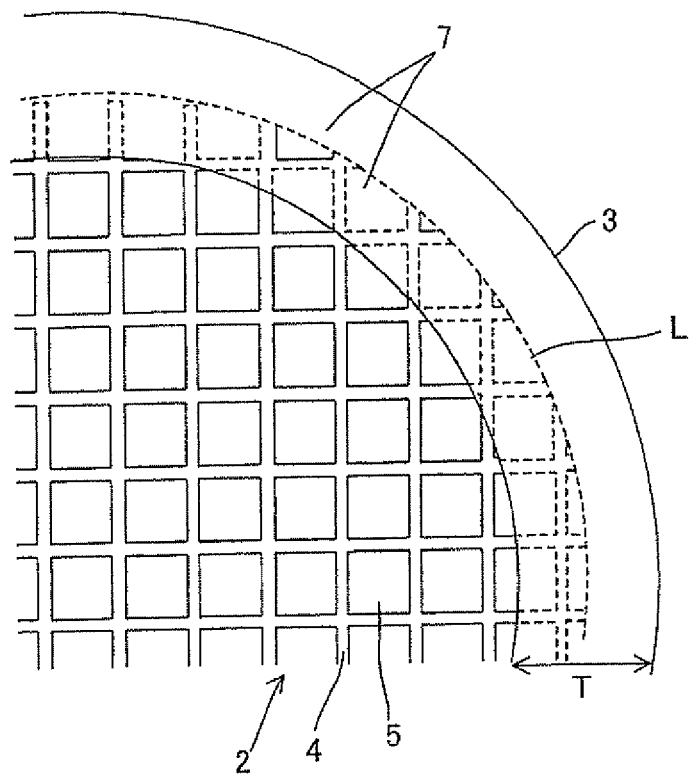
FIG. 4 is a partially enlarged view of the end face shown in FIG. 2.

[1] Honeycomb Structure:

First, an embodiment of a honeycomb structure of the present invention will be described. FIG. 1 is a perspective view schematically showing an embodiment of a honeycomb structure of the present invention, and FIG. 2 is a plan view showing an end face of the honeycomb structure shown in FIG. 1. FIG. 3 is an A-A line cross-sectional view in FIG. 1. In addition, FIG. 4 is a partially enlarged view of the end face shown in FIG. 2.

As shown in FIGS. 1 to 4, a honeycomb structure 1 of the present embodiment is a honeycomb structure 1 provided with a cylindrical cell structure 2 having porous partition walls 4 and a plurality of cells 5 separated and formed by the partition walls 4 and functioning as fluid passages and an outer peripheral coat layer 3 disposed so as to cover the outer periphery of the cell structure 2, and the outer peripheral coat layer 3 has an outer peripheral coat portion 6 disposed so as to cover the outer periphery of the cell structure 2 and a protruding portion 7 protruding outside from an end face 8 of the cell structure 2 and disposed so as to cover the outside portion at the end face 8 of the cell structure 2.

Figure 5:
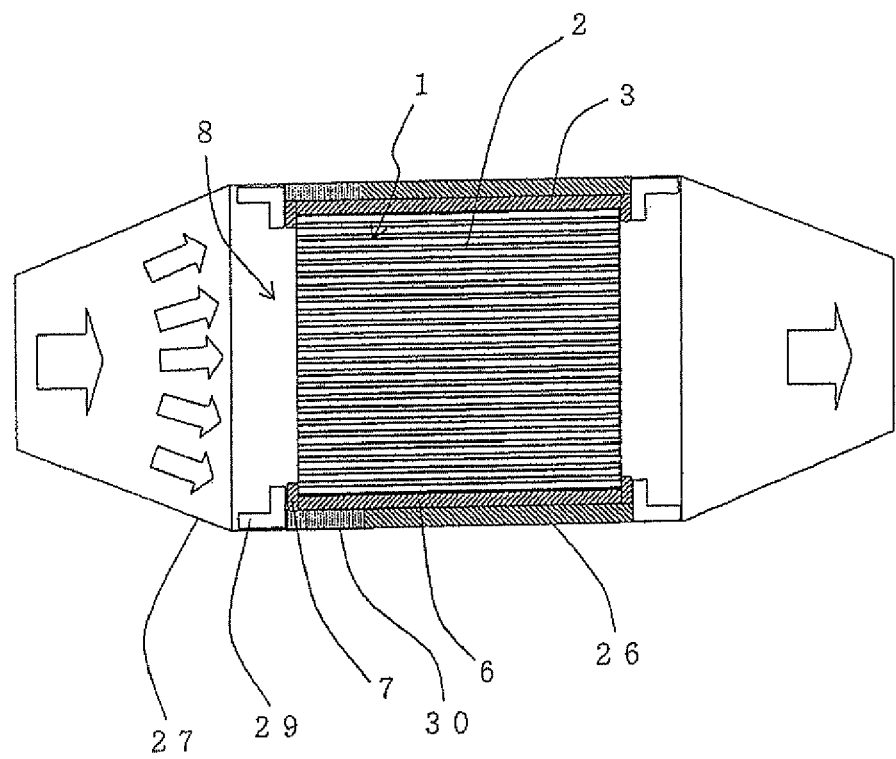
FIG. 5 is a cross-sectional view including the central axis of the honeycomb structure and schematically showing an example of a state of fixing an embodiment of a honeycomb structure of the present invention in a cylindrical metal container.

Thus, in the honeycomb structure 1 of the present embodiment, the outer peripheral coat layer 3 is effectively prohibited from being damaged or peeled, for example, in the case that the honeycomb structure 1 of the present embodiment is used in a state that it is fixed in a cylindrical metal container 27 (converter container) as shown in FIG. 5. Here, FIG. 5 is a cross-sectional view including the central axis (hereinbelow sometimes referred to simply as an "axis") of the honeycomb structure and schematically showing an example of a state of fixing an embodiment of a honeycomb structure of the present invention in a cylindrical metal container.

As shown in FIG. 5, in the case that the honeycomb structure 1 of the present embodiment is used in the state of being fixed in a cylindrical metal container 27, the outer peripheral surface of the honeycomb structure 1 is covered with a heat-resistant holding member 26 having compressive elasticity such as a wire mesh mat, and the honeycomb structure 1 is put in the metal container 27 with applying compressive surface pressure via a holding member 26 in a state that a gas seal 30 is disposed in the inflow side end portion of the honeycomb structure 1. In the outer peripheral portion of the end portion 8 of the honeycomb structure 1, a retainer ring 29 to inhibit movement in the thrust direction is disposed for fixation.

In the honeycomb structure 1 of the present embodiment, the outer peripheral coat layer 3 is effectively inhibited from being damaged and peeled since the boundary portion between the cell structure 2 and the outer peripheral coat layer 3 is covered by the protruding portion 7 of the outer peripheral coat layer 3 even in the case that the metal container 27 expands in the outside direction due to heat of exhaust gas and that the retainer ring 29 tries to move together in the outside direction.

This is considered to be because the outer peripheral coat layer 3 is inhibited from peeling off from the honeycomb structure 1 since the retainer ring slides at the end face of the protruding portion 7 of the outer peripheral coat layer 3 not to directly contact the boundary face between the outer peripheral coat layer 3 and the honeycomb structure 1. In addition, when strain (end face flatness) of an end face of the honeycomb structure or parallelism of both the end faces is extremely large, dimensional precision in the whole length direction of the honeycomb structure 1 deteriorates, and thereby it may be impossible to attach the retainer ring. Therefore, by improving flatness or parallelism in the upper end portion of the protruding portion 7 of the outer peripheral coat layer 3, the dimensional precision in the whole length direction of the honeycomb structure 1 is improved without suffering influence of the end face precision of the honeycomb structure 1 itself, and attachment failure of the retainer ring can be avoided. In addition, the end face can be held by the retainer ring uniformly in a good condition.

Figure 6:
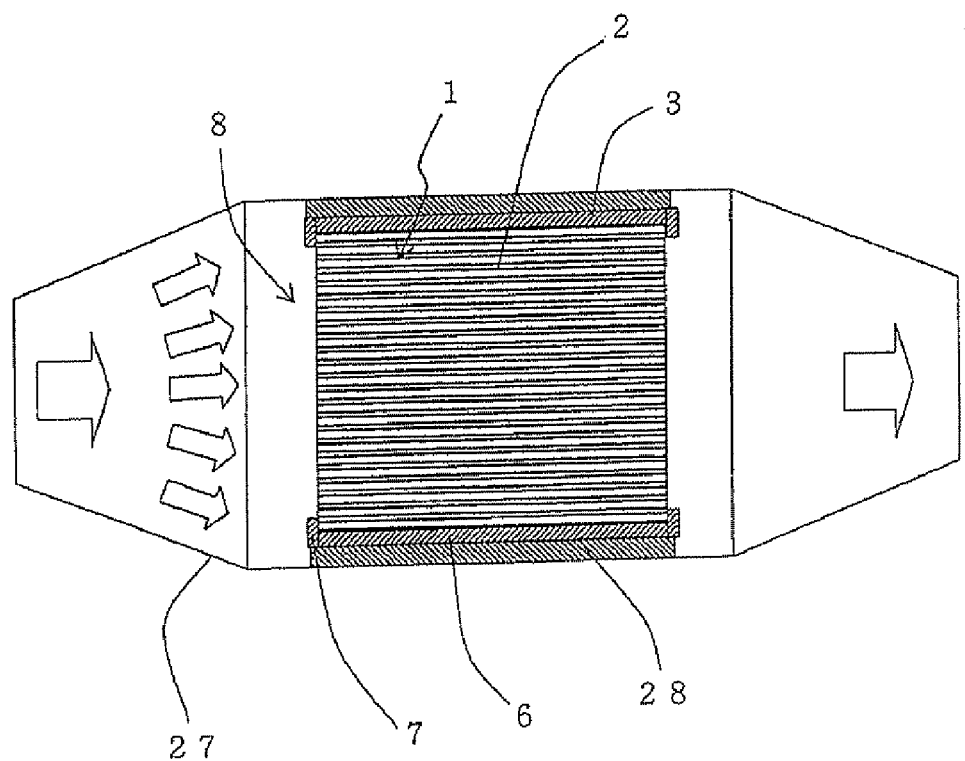
FIG. 6 is a cross-sectional view including the central axis of the honeycomb structure and schematically showing another example of a state of fixing an embodiment of a honeycomb structure of the present invention in a cylindrical metal container.

In addition, for example, also in the case that the honeycomb structure 1 is put in the metal container 27 with applying surface pressure by covering the outer peripheral surface of the honeycomb structure 1 with a holding member 28 such as a ceramic mat having gas sealability as shown in FIG. 6 instead of using the retainer ring 29 (see FIG. 5), the boundary portion between the cell structure 2 and the outer peripheral coat layer 3 is not directly exposed to exhaust gas, and thereby chipping or erosion is not caused from the boundary portion between the cell structure 2 and the outer peripheral coat layer 3. Here, FIG. 6 is a cross-sectional view including the central axis of the honeycomb structure and schematically showing another example of a state of fixing an embodiment of a honeycomb structure of the present invention in a cylindrical metal container.

Thus, the honeycomb structure 1 of the present invention can suitably be used as a filter for exhaust gas from various kinds of internal combustion engines, particularly automobile exhaust gas; a filter for various kinds of filtration machine and tools; a heat exchanger unit; or a carrier for chemical reaction machine and tools such as a reforming catalyst carrier for a fuel cell. In particular, since the outer peripheral coat layer 3 is effectively inhibited from being damaged or peeled in the honeycomb structure 1 of the present embodiment as described above, the honeycomb structure 1 can be used more suitably as a honeycomb structure used by being put in a converter case (for example, a metal container 27 as shown in FIGS. 5 and 6) for housing a filter such as a DPF, a large-sized carrier, or the like.

Incidentally, the honeycomb structure of the present embodiment may further be provided with plugging portions for plugging opening portions of predetermined cells on one end portion side of the cell structure and opening end portions of the other cells on the other end portion side of the cell structure.

Incidentally, though the honeycomb structure 1 of the present embodiment shown in FIGS. 1 to 4 has a circular shape of a cross-section perpendicular to the central axis of the columnar structure of the honeycomb structure 1 (bottom shape), the shape of a cross-section perpendicular to the axial direction of the columnar structure of the honeycomb structure 1 may be an ellipse, an oval, a polygon such as a rectangle, an irregular shape, or the like.

Incidentally, it is preferable that the honeycomb structure 1 of the present embodiment has a circular cross-sectional shape.

[2] Cell Structure:

The cell structure 2 used for the honeycomb structure 1 of the present embodiment has porous partition walls 4 and a cylindrical structure where a plurality of cells 5 are separated and formed by the partition walls 4 to function as fluid passages. Such a cell structure can be obtained by forming, for example, a cell structure with an outer wall having porous partition walls separating and forming a plurality of cells and an outer wall formed unitarily with the partition walls and grinding and removing the outer wall of the resultant cell structure with the outer wall with a grinding stone or the like.

The cell structure 2 shown in FIGS. 1 to 4 has a circular shape of a cross section perpendicular to the central axis (bottom shape). However, the shape may be an ellipse, an oval, a polygon such as an rectangle, an irregular shape, or the like. The shape of a cross section (cross section perpendicular to the axial direction of the cell structure 2) of the cells 5 is not particularly limited, either, and may be a triangle, a polygon such as a hexagon, or the like though it is preferably a rectangle as shown in FIG. 1. In addition, the porosity and the average pore size of the partition walls 4 of the cell structure 2 are not particularly limited, either, as long as the ceramic can be used for an exhaust gas treatment or the like with the porosity and average pore size.

The thickness of the partition walls 4 of the cell structure 2 is not particularly limited. However, when the thickness of the partition walls 4 is too large, pressure loss may be large when fluid passes through the walls. When the thickness is too small, mechanical strength may be insufficient. The thickness of the partition walls 4 is preferably 100 to 1000 μm, more preferably 200 to 800 μm. The material for the porous partition walls 4 is not particularly limited. However, it is preferably ceramic, more preferably at least one selected from a group consisting of cordierite, silicon carbide, Sialon, mullite, silicon nitride, zirconium phosphate, zirconia, titania, alumina, and silica.

The cell density of the cell structure 2 is not particularly limited. However, it is preferably 5 to 300 cells/cm$^2$, more preferably 10 to 100 cells/cm$^2$, and particularly preferably 15 to 50 cells/cm$^2$.

[3] Outer Peripheral Coat Layer:

The outer peripheral coat layer 3 used for the honeycomb structure 1 of the present embodiment has an outer peripheral coat portion 6 disposed so as to cover the outer periphery of the cell structure 2 and a protruding portion 7 protruding outside from the end face 8 of the cell structure 2 and disposed so as to cover the outside portion at the end face 8 of the cell structure 2. Incidentally, in the outer peripheral coat layer 3 of the honeycomb structure 1 of the present embodiment, the protruding portion 7 may be formed on at least one end face 8 side of the cell structure 2. However, it is preferable that the cell structure 2 has the protruding portion 7 on each end face 8 on both sides of the cell structure 2 as shown in FIGS. 1 to 4.

In addition, it is preferable that the protruding portion 7 constituting the outer peripheral coat layer 3 protrudes outside by 0.01 mm or more from the end face 8 of the cell structure 2, more preferably 0.1 mm or more, and particularly preferably 0.3 mm or more.

Such a constitution enables to obtain strength sufficient for protecting the boundary portion between the cell structure 2 and the outer peripheral coat layer 3. Incidentally, when the protruding portion 7 protrudes too much toward outside, the protruding portion 7 may cause interference upon canning to have inconvenience. Therefore, the height from the end face 8 of the cell structure 2 is preferably 3 mm or less, more preferably 2 mm or less, and particularly preferably 1 mm or less.

The width of the portion with which the outside portion is covered (hereinbelow sometimes referred to as a "covering portion") an the end face 8 of the cell structure 2 is not limited as long as the portion can sufficiently cover the boundary portion between the cell structure 2 and the outer peripheral coat portion 6 of the outer peripheral coat layer 3 and as long as the portion covers 0.5 cell or more, preferably 1 cell or more, and more preferably 1.5 cells or more in the outermost periphery of the cell structure 2. When the portion is too wide, the area of the end face 8 of the cell structure 2 decreases, which is not preferable, and the width is made to correspond with 5 cells or less, preferably 3 cells or less, more preferably 2 cells or less. Incidentally, for example, the length for one cell described above means the largest length (diameter) in a cross-sectional shape of one cell 5.

In addition, in the honeycomb structure 1 of the present embodiment, the outer peripheral coat portion 6 and the protruding portion 7 constituting the outer peripheral coat layer 3 may unitarily or independently be formed. Further, in the case that the outer peripheral coat portion 6 and the protruding portion 7 are independently formed, they may employ the same material or different materials. For example, a material having high heat resistance, high durability, and high mechanical strength is preferably used for the protruding portion 7 so that erosion due to exhaust gas can be avoided.

The material for the outer peripheral coat portion 6 constituting the outer peripheral coat layer 3 is not particularly limited. However, the material described in the Patent Documents 1 and 2 is preferable.

The material for the protruding portion 7 constituting the outer peripheral coat layer 3 is not particularly limited. However, the same material as that for the outer peripheral coat portion 6 is preferable in manufacturing. Incidentally, the material for the protruding portion 7 for covering the boundary portion (covering material) may be the same as or different from that for the outer peripheral coat portion 6. In the case of covering the boundary portion by using a different material from that for the outer peripheral coat portion 6, the present method is effective. In particular, in the case of avoiding exhaust gas erosion of the boundary portion, it is preferable to strengthen the covering of the boundary portion of the end face by forming the protruding portion 7 with a material having higher strength than that for the outer peripheral coat portion 6.

The protruding portion 7 constituting the outer peripheral coat layer 3 is simply disposed on the end face 8 of the cell structure 2 or filled into at least opening portions of cells 5.

[4] Method for Manufacturing Honeycomb Structure (First Manufacturing Method):

Next, an embodiment of a method for manufacturing a honeycomb structure of the present invention (first manufacturing method) will be described. By a manufacturing method of the present embodiment, one embodiment of the honeycomb structure of the present invention described above can be manufactured.

A method for manufacturing a honeycomb structure of the present embodiment is a manufacturing method of a honeycomb structure, the method includes a step of forming kneaded clay for forming to obtain a cylindrical cell structure having porous partition walls separating and forming a plurality of cells functioning as fluid passages and a step of forming the outer peripheral coat layer by applying the outer peripheral coat material so as to cover the outer periphery of the cell structure, where, in a state that both the end faces are held by two holding members in such a manner that an outside portion of at least one of the end faces is opened, the outer peripheral coat material is applied so as to cover the outer periphery and the outside portion opened on the end face of the cell structure to form the outer peripheral coat portion 6 disposed so as to cover the outer periphery of the cell structure 2 and the protruding portion 7 protruding outside from the end face 8 of the cell structure 2 and disposed so as to cover the outside portion at the end face 8 of the cell structure 2 as shown in FIGS. 1 to 4.

Such a constitution enables to easily manufacture a honeycomb structure 1 as shown in FIGS. 1 to 4 at low costs. Hereinbelow, a method for manufacturing a honeycomb structure of the present embodiment (first manufacturing method) will be described more specifically.

Figure 7:
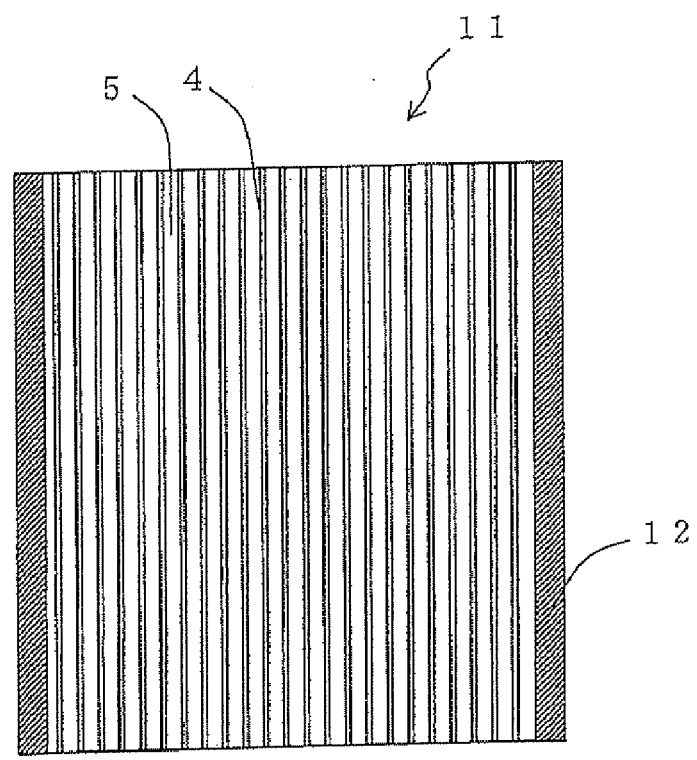
FIG. 7 is a cross-sectional view including the central axis of the cell structure with the outer wall obtained by a method for manufacturing a honeycomb structure of the present invention (first manufacturing method).

In method for manufacturing a honeycomb structure of the present embodiment, in the first place, as shown in FIG. 7, a predetermined forming raw material is kneaded to prepare kneaded clay for forming, the kneaded clay for forming is formed to obtain a cylindrical cell formed article with an outer wall which is unitarily formed, and the cylindrical cell formed article with an outer wall is dried and fired to obtain a cell structure 11 with an outer wall, the cell structure 11 having porous partition walls 4 separating and forming a plurality of cells 5 and the outer wall 12 which is formed unitarily with the partition walls 4.

There is no particular limitation on the method for obtaining such a cell structure 11 with an outer wall, and the method can be performed according to a method for forming a cell structure in a conventionally known method for manufacturing a honeycomb structure. At this time, there is no limitation on the composition of kneaded clay, forming conditions, drying and firing conditions, and known conditions may suitably be selected according to the aimed honeycomb structure. Since the outer wall 12 is removed from the cell structure with the outer wall 11 to obtain a cell structure 2 in a method for manufacturing a honeycomb structure of the present embodiment, the elements which are common with the aforementioned cell structure constituting one embodiment of a honeycomb structure of the present invention preferably satisfy similar conditions.

Here, FIG. 7 is a cross-sectional view including the central axis of the cell structure with the outer wall obtained by a method for manufacturing a honeycomb structure of the present invention (first manufacturing method).

As a method for preparing kneaded clay for forming by kneading a forming raw material, there may be employed a method using a kneader, a vacuum kneader, or the like. As a forming raw material for preparing kneaded clay for forming, the aforementioned material for forming the partition wall of the cell structure in one embodiment of a honeycomb structure of the present invention described above can suitably be used.

As a method for forming the aforementioned formed article with an outer wall, there may be employed a conventionally known forming method such as extrusion forming, injection forming, and press forming. Of these, an example of a suitable method is a method of extrusion forming kneaded clay prepared as described above by using a die having predetermined thickness of outer peripheral wall, thickness of partition walls, and cell density.

As a drying method, there may be employed a conventionally known method such as hot air drying, microwave drying, dielectric drying, reduced-pressure drying, vacuum drying, freeze drying, and superheated-steam drying. Of these, in that the whole formed article can be dried quickly and uniformly, a drying method where hot air drying and microwave drying or dielectric drying are combined is preferable. Drying conditions can suitably be selected according to the shape, material, and the like of the cell formed article with an outer wall.

The firing furnace for firing the cell formed article with an outer wall dried in the aforementioned method and the firing conditions can suitably be selected according to the shape, material, and the like of the cell formed article with an outer wall. Organic matter such as a binder may be combustion-removed by calcination before firing.

Incidentally, after the cell formed article with an outer wall is dried or fired, plugging may be performed in opening portions of cells at an end face in a predetermined pattern. As the method for plugging, a known method can be employed.

When plugging is performed, it is general to plug in such a manner that each end face has a checkerwise pattern. However, there may be employed a pattern where a plurality of plugged portions are located in a concentrated state, while a plurality of unplugged portions are located in a concentrated state; or a pattern of a line or a concentric circle.

Figure 8:
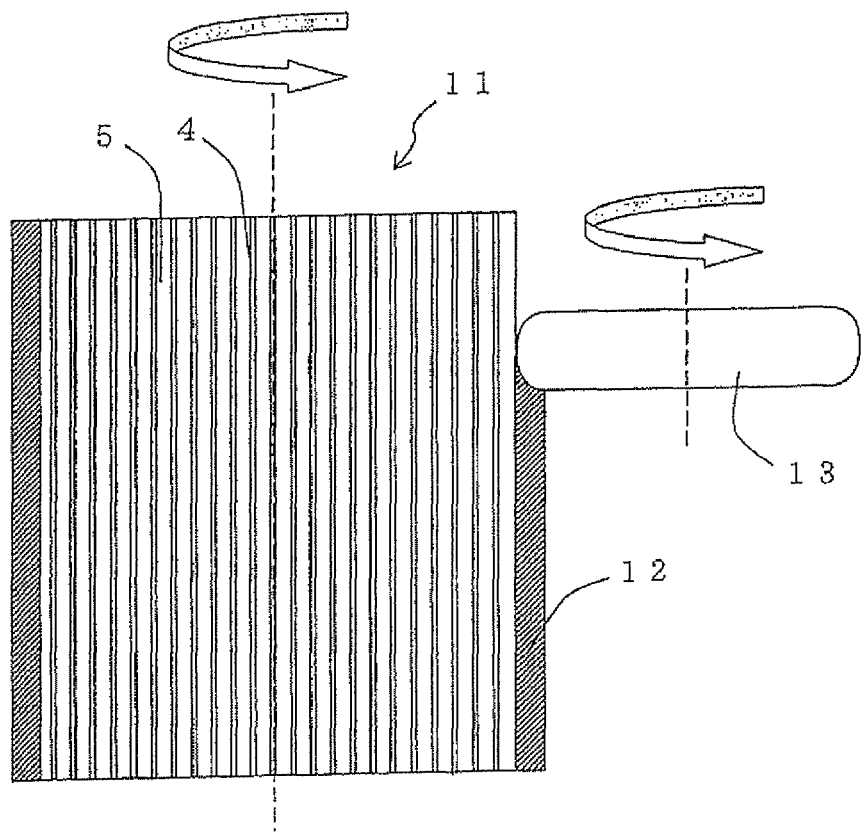
FIG. 8 is a cross-sectional view including the central axis of the cell structure and schematically showing a manner of grinding the peripheral edge portion of the cell structure with the outer wall with a grinding stone in an embodiment of a method for manufacturing a honeycomb structure of the present invention (first manufacturing method).
Figure 9:
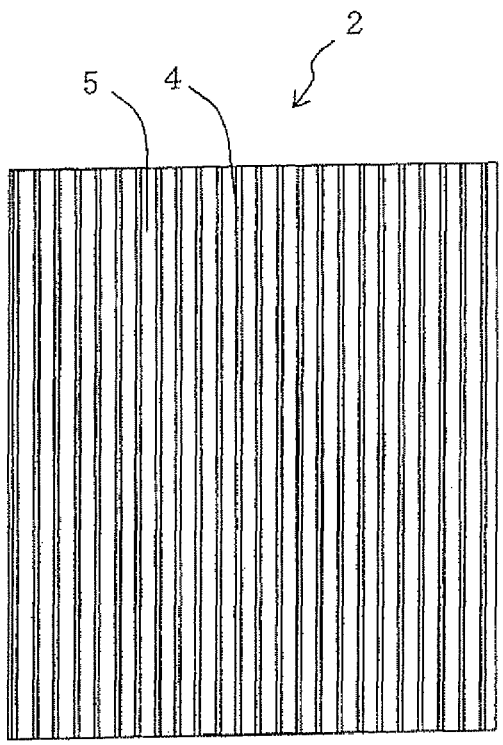
FIG. 9 is a cross-sectional view including the central axis of the cell structure used in one embodiment of a method for manufacturing a honeycomb structure of the present invention (first manufacturing method).

Next, as shown in FIG. 8, the outer wall 12 and a part of the partition walls 4 (peripheral edge portion) of the resultant cell structure with an outer wall 11 are subjected to grinding to obtain a cylindrical cell structure 2 having porous partition walls 4 and a plurality of cells 5 separated and formed by the partition walls 4 and functioning as fluid passages as shown in FIG. 9. FIG. 8 is a cross-sectional view including the central axis of the cell structure and schematically showing a manner of grinding the peripheral edge portion of the cell structure with the outer wall with a grinding stone in an embodiment of a method for manufacturing a honeycomb structure of the present invention (first manufacturing method), and FIG. 9 is a cross-sectional view including the central axis of the cell structure used in one embodiment of a method for manufacturing a honeycomb structure of the present invention (first manufacturing method).

Upon grinding, as shown in FIG. 8, the peripheral edge portion including the outer wall 12 is ground by bringing the grinding stone 13 into contact with the outer wall 12 with rotating the cell structure with the outer wall 11 around the central axis. It is preferable that the grinding stone 13 is brought into contact with the outer wall 12 with being rotated, and it is preferable to grind by a traverse grinding method where the whole outer wall 12 of the cell structure with an outer wall 11 is ground with moving the grinding stone 13 from one end portion to the other end portion in parallel with the central axis of the cell structure with an outer wall 11 in that process quality can be secured.

In addition, since chipping may be caused at a corner portion in the end portion on the side where the grinding stone is detached, there may be employed a method where the grinding stone is temporarily detached outside from the cell structure with the outer wall in an intermediate portion to be moved to the other end portion to grind the whole outer wall of the cell structure with the outer wall with moving the grinding stone in the inverse direction from the other end portion to the one end portion. There is no particular limitation on the method and apparatus for rotating the cell structure with the outer wall 11.

In addition, there may be employed a plunge grinding method where the grinding with the grinding stone is performed at once over the whole length of the cell structure with the outer wall. In addition to the grinding using a grinding stone as described above, grinding may be performed with a cutting tool or a screw-type tool.

Figure 10:
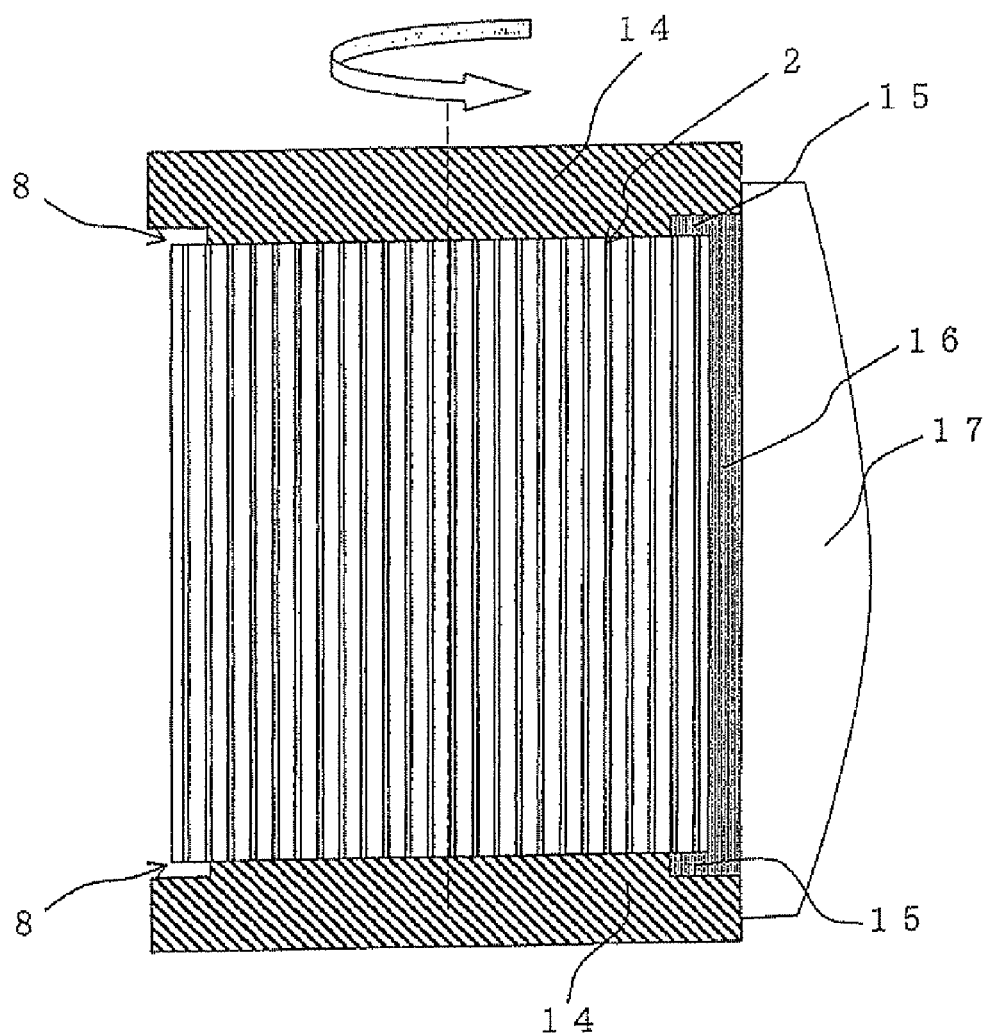
FIG. 10 is a cross-sectional view including the central axis and schematically showing an example of a step of forming the outer peripheral coat layer by applying an outer peripheral coat material in one embodiment of a method for manufacturing a honeycomb structure of the present invention (first manufacturing method).

Next, as shown in FIG. 10, in the state that both the end faces are held by two holding members 14 in such a manner that the outside portion of at least one face 8 is opened, the outer peripheral coat material 16 is applied so as to cover the outer periphery of the cell structure 2 and the opening outside portion 15 at the end face of the resultant cell structure 2 to form the outer peripheral coat layer 3 having the outer peripheral coat portion 6 disposed so as to cover the outer periphery of the cell structure 2 and the protruding portion 7 disposed so as to cover the outside portion at the end face 8 of the cell structure 2 as shown in FIG. 3.

When such an outer peripheral coat layer 3 is formed, as shown in FIG. 10, there may suitably be employed a method where the outer peripheral coat material 16 is leveled with a spatula for coating with supplying the material 16 on the outer periphery of the cell structure 2 in the state that the cell structure 2 and the two holding members 14 are rotated around the axis of the cell structure 2. This fills the outer peripheral coat material 16 on the outer periphery and the opening outside portion 15 at the end face 8 of the cell structure 2 to form the outer peripheral coat layer (see FIG. 3). Here, FIG. 10 is a cross-sectional view including the central axis and schematically showing an example of a step of forming the outer peripheral coat layer by applying an outer peripheral coat material in one embodiment of a method for manufacturing a honeycomb structure of the present invention (first manufacturing method).

Figure 11:
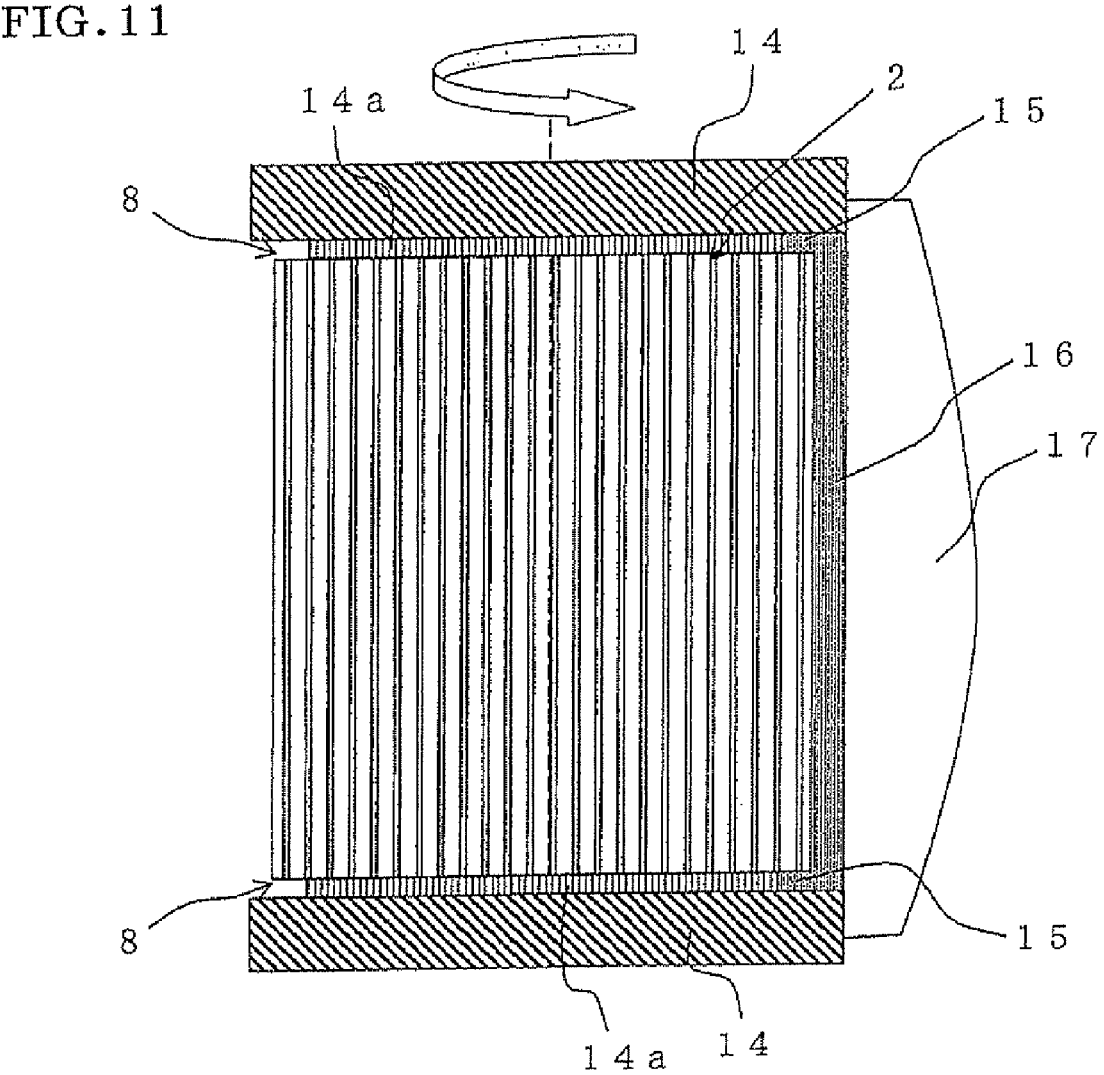
FIG. 11 is a cross-sectional view including the central axis and schematically showing another example of a step of forming the outer peripheral coat layer by applying an outer peripheral coat material in one embodiment of a method for manufacturing a honeycomb structure of the present invention (first manufacturing method).

Incidentally, as a method for holding both the end faces with two holding members in such a manner that an outside portion of the aforementioned at least one end face, there may be employed, for example, a method where holding members 14 having a step formed thereon is used so that an outside portion of at least one end face 8 of the cell structure 2 is opened and a method where a spacer 14a having a smaller area than that of the end face 8 is disposed on the end face 8 of the cell structure 2 as shown in FIG. 11. Here, FIG. 11 is a cross-sectional view including the central axis and schematically showing another example of a step of forming the outer peripheral coat layer by applying an outer peripheral coat material in one embodiment of a method for manufacturing a honeycomb structure of the present invention (first manufacturing method). In FIGS. 8 to 13, each of the steps are performed with disposing the honeycomb structure in such a manner that the whole length direction is in parallel with the installation surface. However, it is not limited to the disposition in parallel with the installation surface, and the steps may be performed with disposing the structure in a horizontal direction or an oblique direction.

Thus, in a method for manufacturing a honeycomb structure of the present embodiment, the protruding portion 7 (see FIG. 3) of the outer peripheral coat layer 3 (see FIG. 3) is formed by filling the outer peripheral coat material 16 in the opened outside portion 15 in at least one end face. Therefore, it is preferable that the shape of the opened outside portion 15 of the end face 8 of the cell structure 2 when the cell structure 2 is held is suitably be selected according to the shape of the protruding portion 7 (see FIG. 3) of the outer peripheral coat layer 3 (see FIG. 3).

Incidentally, the material for the aforementioned holding members 14 holding the cell structure 2 is not particularly limited and may be ceramic, metal, resin, wood, or the like. However, the sliding portion with the spatula has hard abrasion, abrasion-resistant material is preferably used.

As the spatula 17 for coating, a plate-shaped member having a length with which the portions corresponding with the outer peripheral coat portion 6 (see FIG. 3) and the protruding portion 7 (see FIG. 3) can uniformly be leveled. When the outer peripheral coat material 16 is supplied to the outer periphery of the cell structure 2, the spatula 17 for coating is disposed in parallel with the central axis of the cell structure 2 in the state that the spatula 17 is apart from the outermost periphery of the cell structure 2 at a predetermined distance (specifically, a distance corresponding with the thickness of the outer peripheral coat portion 6 (see FIG. 3) to be formed). Incidentally, the material for the spatula 17 for coating is not particularly limited. However, since abrasion with the holding member 14 is hard, abrasion-resistant material such as ceramic and metal is preferably used.

In the case that the coat layer is not sufficiently formed only by one round of the spatula 17 for coating around the outer peripheral surface of the cell structure 2, a good applying state can be obtained by forming a coat layer by some rounds of the spatula 17 for coating. At the terminal of application by the spatula for coating, a subtle step is generated on the coat layer surface. To avoid the step, after the coating is completed, the supply of the coat material is stopped, and the spatula 17 for coating is moved for some rounds, or the step portion is removed after the completion of coating. If the degree of the step portion does not become a problem upon canning, the step portion may be left as it is.

The method and apparatus for rotating the cell structure are preferably the same as those for rotating the cell structure with the outer wall 11 (see FIG. 8).

Then, the outer peripheral coat material 16 (outer peripheral coat layer) applied above is dried, and firing is performed as necessary to obtain a honeycomb structure 1 as shown in FIGS. 1 to 4. As the drying method of the outer peripheral coat layer, hot air drying at 100 to 200° C. is general. However, in order to avoid dry cracking of the outer peripheral coat layer, a combination with windless drying by an electric heater, a far-infrared radiation, or the like is suitable. Further, a combination with a means to adjust drying speed by humidification is also suitable. In addition, it is also preferable to make the outer peripheral coat layer hard by a thermal treatment at high temperature after drying.

[5] Method for Manufacturing a Honeycomb Structure (Second Manufacturing Method):

Next, one embodiment of a method for manufacturing a honeycomb structure of the present invention (second manufacturing method) will be described. By a manufacturing method of the present embodiment, one embodiment of a honeycomb structure of the present invention described above can be manufactured.

A method for manufacturing a honeycomb structure of the present embodiment is a method for manufacturing a honeycomb structure, the method being provided with a step of forming kneaded clay for forming to obtain a cylindrical cell structure having partition walls separating and forming a plurality of cells functioning as fluid passages and a step of applying an outer peripheral coat material so as to cover the outer periphery of the cell structure to form an outer peripheral coat layer; wherein, after the outer peripheral coat material is applied so as to cover the outer periphery of the cell structure, the outer peripheral coat material is further applied so as to cover the outside portion at an end face of at least one side of the cell structure, to form the outer peripheral coat layer 3 having the outer peripheral coat portion 6 disposed so as to cover the outer periphery of the cell structure 2 and the protruding portion 7 protruding outside from the end face 8 of the cell structure 2 and disposed so as to cover the outside portion at the end face 8 of the cell structure 2.

Such a constitution enables to manufacture a honeycomb structure 1 as shown in FIGS. 1 to 4 easily at low costs. Hereinbelow, a method for manufacturing a honeycomb structure of the present embodiment (second manufacturing method) will be described more specifically.

In a method for manufacturing a honeycomb structure of the present embodiment, in the first place, a predetermined forming raw material is kneaded to prepare kneaded clay for forming, the kneaded clay for forming is formed to obtain a cylindrical cell formed article with an outer wall which is unitarily formed, and the cylindrical cell formed article with an outer wall is dried and fired to obtain a cell structure 11 with an outer wall.

Next, the outerwall and a part of partition walls (peripheral edge portion) of the resultant cell structure with the outer wall are ground to obtain a cylindrical cell structure having porous partition walls and a plurality of cells functioning as a fluid passage by the partition walls. Regarding the steps until the cell structure is obtained, a method similar to that in the case of the first manufacturing method (see FIGS. 7 to 9) can suitably be used.

Figure 12:
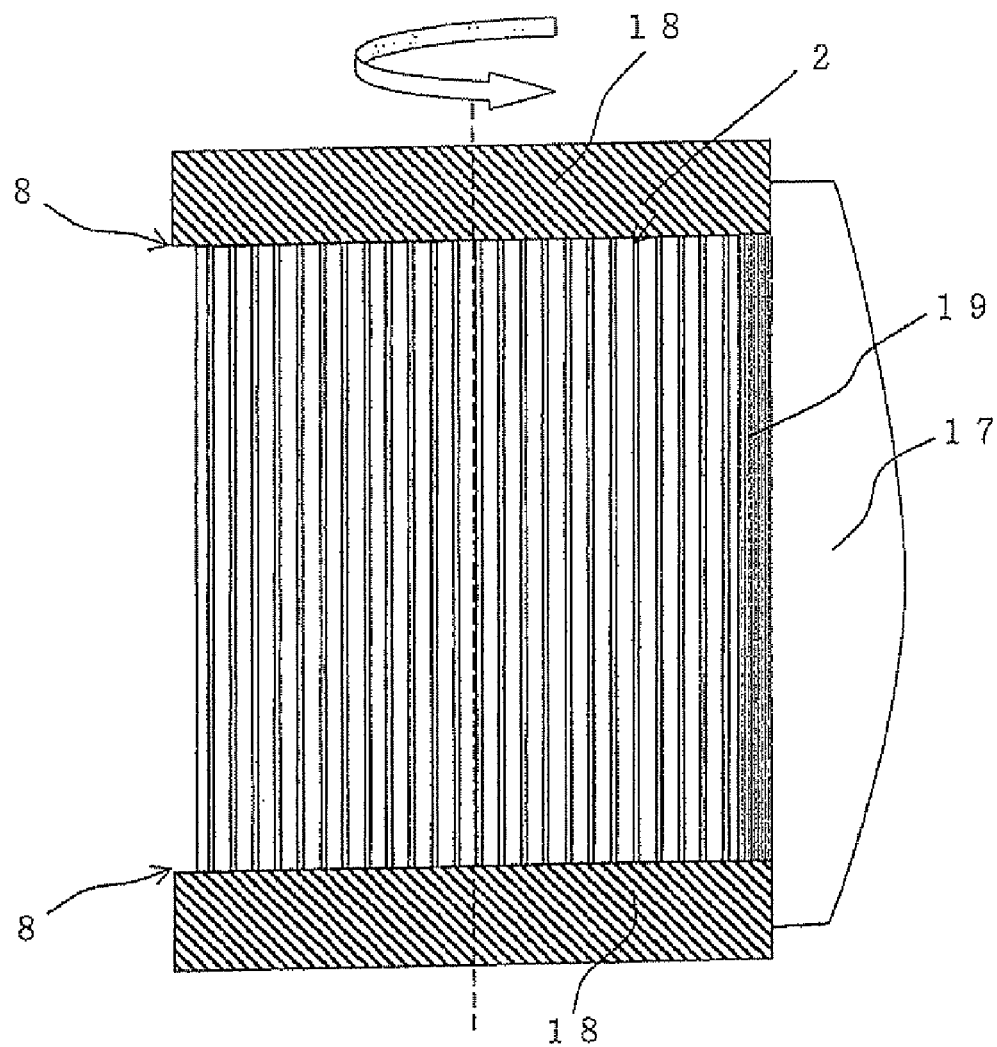
FIG. 12 is a cross-sectional view including the central axis and schematically showing the step of forming an outer peripheral coat portion in one embodiment of a method for manufacturing a honeycomb structure of the present invention (second manufacturing method).

Then, as shown in FIG. 12, with holding the resultant cell structure with two holding members 18, the outer peripheral coat material 19 (hereinbelow sometimes referred to as the "first outer peripheral coat member 19") is supplied in the outer periphery of the cell structure 2 with leveling the first outer peripheral coat material 19 with a spatula 17 for coating in the state that the cell structure 2 and the two holding members 18 are rotated around the axis of the cell structure 2 to obtain the outer peripheral coat portion 6 (see FIG. 3) constituting the outer peripheral coat layer 3 (see FIG. 3). The outer peripheral coat portion 6 (see FIG. 3) is formed in the portion corresponding with a gap between the outer periphery of the cell structure 2 and the spatula 17 for coating. Here, FIG. 12 is a cross-sectional view including the central axis and schematically showing the step of forming an outer peripheral coat portion in one embodiment of a method for manufacturing a honeycomb structure of the present invention (second manufacturing method).

In a method for manufacturing a honeycomb structure of the present invention, it is not necessary to open the outer peripheral portion in at least one end face unlike the first manufacturing method described above when the end face 8 of the cell structure 2 is held using two holding members 18, and the whole end face 8 of the cell structure 2 may be held by a flat surface. Thus, when the cell structure 2 is held with the holding portions 18, the end faces of the cell structure 2 are just held by the flat surfaces of the holding members 18. Therefore, the portion corresponding with the outer peripheral portion 6 (see FIG. 3) of the outer peripheral coat layer 3 can be formed by applying the first outer peripheral coat material 19 on the whole outer peripheral surface of the cell structure 2.

The shape, material, method of use, and the like of the spatula 17 for coating are preferably in conditions similar to those in the aforementioned first manufacturing method.

The method and apparatus for rotating the cell structure 2 is preferably similar to those for rotating the cell structure 2 (see FIG. 8) in the aforementioned first manufacturing method.

Figure 13:
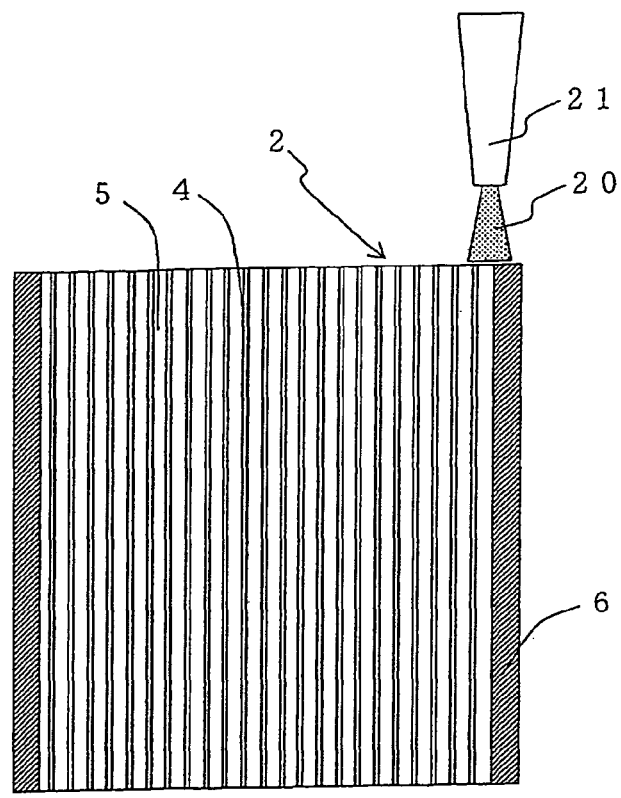
FIG. 13 is a cross-sectional view including the central axis and schematically showing the step of forming a protruding portion in one embodiment of a method for manufacturing a honeycomb structure of the present invention (second manufacturing method).
Figure 14:
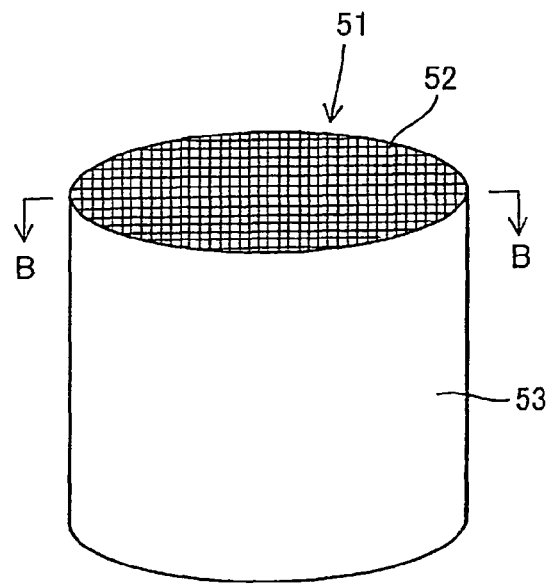
FIG. 14 is a perspective view schematically showing a conventional honeycomb structure.
Figure 15:
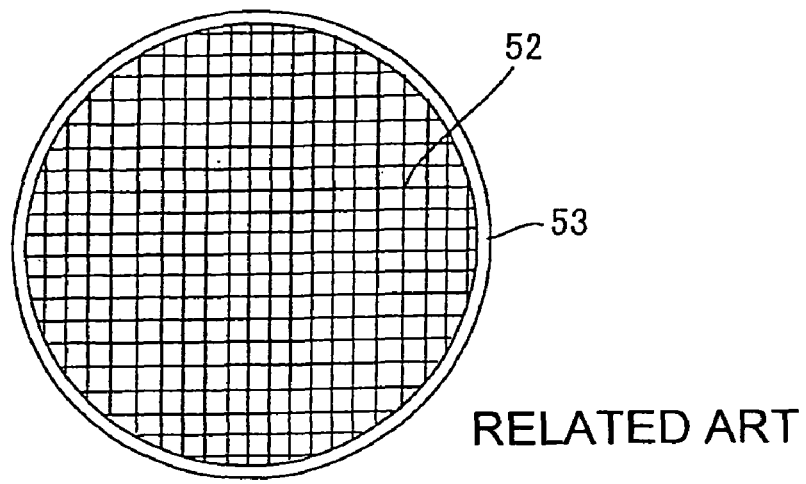
FIG. 15 is a plan view showing an end face of the honeycomb structure shown in FIG. 14.
Figure 16:
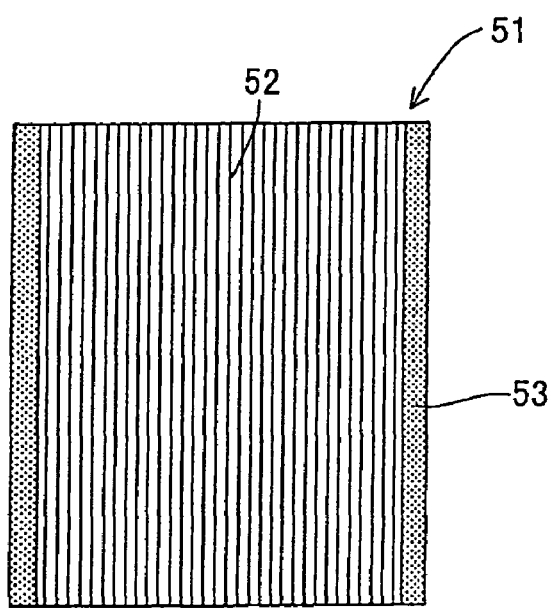
FIG. 16 is a B-B line cross-sectional view in FIG. 14.
Figure 17:
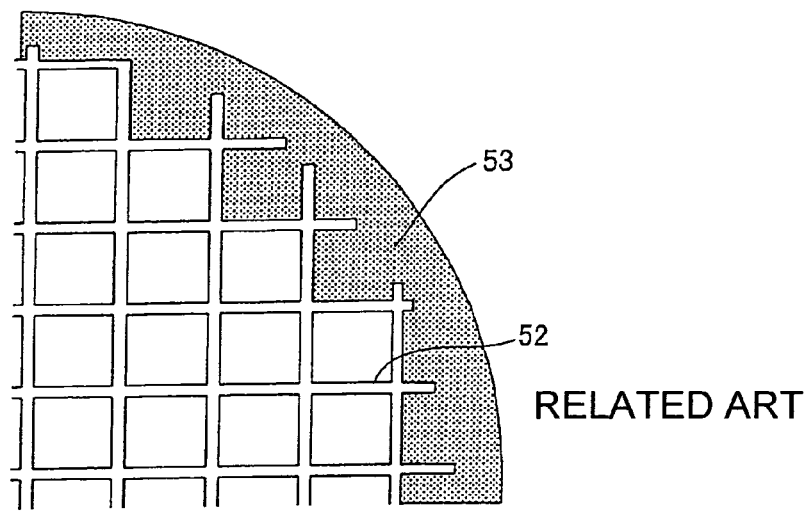
FIG. 17 is a partially enlarged view of the end face shown in FIG. 15.
Figure 18:
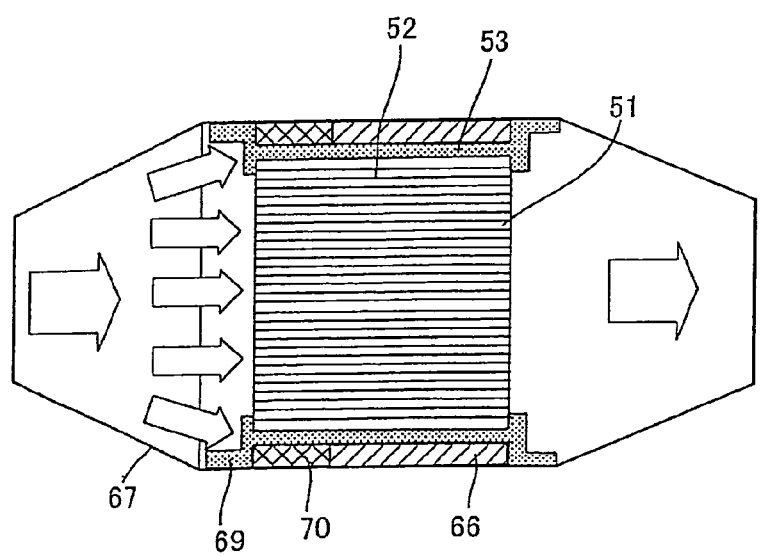
FIG. 18 is a cross-sectional view including the central axis and schematically showing an example of a state of fixing a conventional honeycomb structure in a cylindrical metal container.
Figure 19:
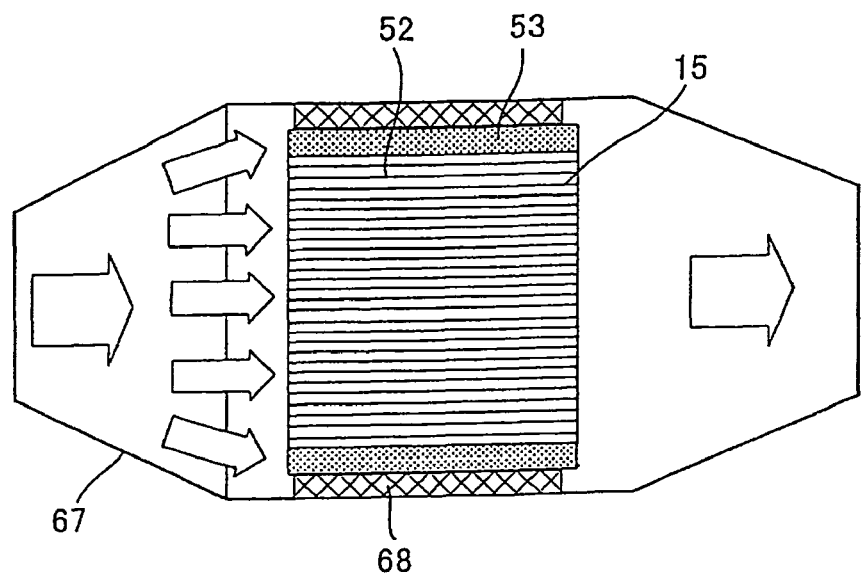
FIG. 19 is a cross-sectional view including the central axis and schematically showing another example of a state of fixing a conventional honeycomb structure in a cylindrical metal container.

Next, as shown in FIG. 13, the outer peripheral coat material 20 (hereinbelow referred to as the "second outer peripheral coat material 20") is further applied so as to cover the outside portion in at least one end face 8 of the cell structure 2 to form a portion corresponding to the protruding portion 7 (see FIG. 3) of the outer peripheral coat layer 3 (see FIG. 3). Here, FIG. 13 is a cross-sectional view including the central axis and schematically showing the step of forming a protruding portion in one embodiment of a method for manufacturing a honeycomb structure of the present invention (second manufacturing method).

As a method for applying the second outer peripheral coat material 20 so as to cover the outside portion at the end face 8 of the cell structure 2, there may suitably be employed, for example, a method of using a nozzle 21 for application.

Then, the outer peripheral coat layer 3 (see FIG. 3) made of the first outer peripheral coat material 19 and the second outer peripheral coat material 20 is dried in the same manner as in the first manufacturing method, and fired as necessary to obtain a honeycomb structure 1 as shown in FIGS. 1 to 4. In a method for manufacturing a honeycomb structure of the present embodiment, since the protruding portion 7 is formed after the outer peripheral coat portion 6 constituting the outer peripheral coat layer 3 is formed, for example, the outer peripheral coat portion 6 and the protruding portion 7 can employ different materials. For example, when the outer peripheral coat portion 6 and the protruding portion 7 employ different materials, a material having high durability and high mechanical strength is preferably used for the protruding portion 7 so that erosion by exhaust gas can be suppressed.

EXAMPLE

Hereinbelow, the present invention will specifically be described on the basis of Examples. However, the present invention is by no means limited to the Examples.

Example 1

A cordierite-forming raw material was used as a forming raw material, which was kneaded by a kneader to prepare kneaded clay for forming. The resultant kneaded clay for forming was subjected to extrusion forming using a die which gives a cell structure with a rectangular cell of 12 mil/300 cpsi (0.3048 mm/46.5 (cells/cm$^2$)) and a cell pitch of 1.47 mm to obtain a formed article. Both the end faces of the resultant formed article were alternately plugged, and the formed article was dried and fired to obtain a cell structure with an outer wall.

The, the peripheral portion of the resultant cell structure with the outer wall was ground to obtain a cell structure having a diameter of the outermost periphery of 354 mmΦ. Then, in a state that both the end faces were held with two holding members so that the outside portion of the end faces of the cell structure as shown in FIG. 8 were opened, an outer peripheral coat material was applied so as to cover the outer periphery and the outside portion at the end face of the cell structure to manufacture a honeycomb structure as shown in FIG. 1. Incidentally, the external form of the whole honeycomb structure had a diameter of 356 mmΦ, and the protruding portion of the outer peripheral coat layer protruded outside by 0.5 mm from the end face of the cell structure and was disposed so as to cover the range from the portion on the outer peripheral side to 3.5 mm at the end face of the cell structure.

Example 2

In the same manner as in Example 1, there was obtained a cell structure having a rectangular cell structure 17 mil/100 cpsi (0.4318 mm/15.5 (cells/cm$^2$)), a cell pitch of 2.54 mm, and a diameter of the outermost periphery of 404 mmΦ. Then, the coat material was applied in the outer periphery to form the outer peripheral coat portion constituting the outer peripheral coat layer. Further, the outer peripheral coat material was further applied so as to cover the outside portion at the end face of the cell structure to form a protruding portion constituting the outer peripheral coat layer. Thus, a honeycomb structure as shown in FIG. 1 was manufactured. The external form of the whole honeycomb structure had a diameter of 406 mmΦ and a length in the direction of the central axis of 432 mm. In addition, a protruding portion of the outer peripheral coat layer protruded outside by 1 mm from the end face of the cell structure and was disposed so as to cover the range from a portion on the outer peripheral side at an end face of the cell structure to 5 mm.

Comparative Example 1

In the same manner as in the case of Example 2, the outer peripheral coat layer was formed only in the outer peripheral portion of the cell structure having the same size and cell structure as in Example 2 to manufacture a honeycomb structure of Comparative Example 1.

Each of the honeycomb structures of Examples 1 and 2 and Comparative Example 1 was canned in a converter, and a burner spalling test, where an operation of heating by a gas burner apparatus and then cooling was repeated, was carried out under the following conditions. Then, the state of the end face of each honeycomb structure was observed.

(Burner Spalling Test Conditions)

Test apparatus: Gas burner spalling apparatus

Heating conditions (for one cycle): Temperature was raised from 100° C. (lowest temperature) to 750° C. (highest temperature) for 10 minutes, kept at 750° C. for 10 minutes, cooled from 750° C. to 100° C. for 30 minutes, and kept at 100° C. for 10 minutes.

Heating cycle number: 200 cycle (Discussion)

As a result of the burner spalling test, the honeycomb structure of Examples 1 and 2, there was no chipping caused in the outer peripheral coat layer. The honeycomb structure of Comparative Example 1 had chipping caused in the end portion of the outer peripheral coat layer. From these results, it can be understood that, in the honeycomb structure of the present invention, the outer peripheral coat layer disposed so as to cover the outer periphery of the cell structure is effectively inhibited from being damaged and peeled.

Industrial Applicability

In a honeycomb structure of the present invention, since the outer peripheral coat layer disposed so as to cover the outer periphery of the cell structure is effectively inhibited from being damaged and peeled, the structure can suitably be used as a DPF, or a catalyst carrier.

The invention claimed is:

1. A method for manufacturing a honeycomb structure, the method comprising:

forming kneaded clay for forming to obtain a cylindrical cell structure having partition walls separating and forming a plurality of cells functioning as fluid passages: and applying an outer peripheral coat material so as to cover an outer periphery of the cell structure to form an outer peripheral coat layer, wherein in a state that both end faces of the cell structure are gripped by two gripping members in such a manner that an outside portion of at least one of the end faces is opened, the outer peripheral coat material is applied so as to cover the outer periphery of the cell structure and the outside portion of the at least one of the end faces that is opened, to form an outer peripheral coat portion disposed so as to cover the outer periphery of the cell structure and a protruding portion protruding outside from the at least one end face of the cell structure and disposed so as to cover the outside portion of the at least one of the end faces of the cell structure.

2. A method for manufacturing a honeycomb structure, the method comprising:

forming kneaded clay for forming to obtain a cylindrical cell structure having partition walls separating and forming a plurality of cells functioning as fluid passages: and applying an outer peripheral coat material so as to cover an outer periphery of the cell structure to form an outer peripheral coat layer, wherein after the outer peripheral coat material is applied so as to cover the outer periphery of the cell structure, the outer peripheral coat material is further applied so as to cover an outside portion of the planar surface of an end face of at least one side of the cell structure, to form the outer peripheral coat layer having an outer peripheral coat portion disposed so as to cover the outer periphery of the cell structure and a protruding portion protruding outside from the end face of the cell structure and disposed so as to cover the outside portion of the end face of at least one side of the cell structure.

* * * * *